(12) United States Patent
Pati et al.

(10) Patent No.: US 10,547,903 B2
(45) Date of Patent: Jan. 28, 2020

(54) ADVERTISEMENT DISPLAY BASED ON CHANNEL SWITCH

(71) Applicant: ARRIS Enterprises, Inc., Suwanee, GA (US)

(72) Inventors: Satya Prakash Pati, Bangalore (IN); Krishna Prasad Panje, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 23 days.

(21) Appl. No.: 14/922,415

(22) Filed: Oct. 26, 2015

(65) Prior Publication Data

US 2017/0118513 A1    Apr. 27, 2017

(51) Int. Cl.
*H04N 21/442* (2011.01)
*H04N 21/81* (2011.01)

(52) U.S. Cl.
CPC ..... *H04N 21/44222* (2013.01); *H04N 21/812* (2013.01)

(58) Field of Classification Search
CPC .............. H04N 21/44222; H04N 21/812
See application file for complete search history.

(56) References Cited

U.S. PATENT DOCUMENTS

| | | | | |
|---|---|---|---|---|
| 5,786,845 A * | 7/1998 | Tsuria | ................ | H04N 5/44513 348/E5.102 |
| 5,907,321 A * | 5/1999 | Grossman | ................ | H04N 5/44 348/E5.096 |
| 7,237,251 B1 * | 6/2007 | Oz | ........................ | H04N 5/4401 348/E5.006 |
| 8,255,949 B1 * | 8/2012 | Bayer | ................ | G06Q 30/0241 725/32 |
| 8,671,423 B1 * | 3/2014 | Chang | ................ | H04N 21/4126 705/14.4 |
| 8,949,891 B2 * | 2/2015 | Gauthier | ................ | G06Q 30/00 725/38 |
| 2002/0042914 A1 * | 4/2002 | Walker | ................... | G06Q 30/02 725/36 |
| 2002/0087978 A1 * | 7/2002 | Nicholson | .............. | H04N 7/173 725/34 |
| 2002/0199188 A1 * | 12/2002 | Sie | ........................ | H04N 21/00 725/35 |

(Continued)

FOREIGN PATENT DOCUMENTS

WO    WO 2013/180325    *    5/2013    ........... H04N 21/458

*Primary Examiner* — Nathan J Flynn
*Assistant Examiner* — Tung T Trinh
(74) *Attorney, Agent, or Firm* — Bart A. Perkins (57) ABSTRACT

Methods, systems, and computer readable media can be operable to facilitate selective advertisement display based on a channel switch. When a channel switch from a first channel to a second channel is initiated at a set-top box (STB), the STB may identify one or more properties associated with the second channel. Advertisement content may be stored at the STB, and each piece of advertisement content may be associated with one or more channel identifiers, genres/categories, or other channel properties. The STB may identify advertisement content that is associated with a channel identifier, genre/category, or other property of the second channel, and the identified advertisement content may be output to a display device during an acquisition of the second channel or for another predetermined duration.

14 Claims, 6 Drawing Sheets

(56) References Cited

U.S. PATENT DOCUMENTS

| | | | | |
|---|---|---|---|---|
| 2003/0208763 A1* | 11/2003 | McElhatten | G06F 3/0482 | 725/58 |
| 2005/0028202 A1* | 2/2005 | Lee | H04N 5/44508 | 725/42 |
| 2005/0086692 A1* | 4/2005 | Dudkiewicz | H04N 5/44543 | 725/46 |
| 2008/0090513 A1* | 4/2008 | Collins | H04H 60/65 | 455/3.01 |
| 2008/0170564 A1 | 7/2008 | Shi et al. | | |
| 2009/0106792 A1* | 4/2009 | Kan | H04N 7/17318 | 725/34 |
| 2009/0178079 A1* | 7/2009 | Derrenberger | H04N 5/44543 | 725/42 |
| 2009/0199230 A1* | 8/2009 | Kumar | G06Q 30/02 | 725/32 |
| 2009/0239514 A1* | 9/2009 | Kenagy | H04H 20/106 | 455/414.3 |
| 2010/0030713 A1* | 2/2010 | Simpson | G06Q 30/0254 | 706/11 |
| 2010/0162298 A1* | 6/2010 | Ahn | H04H 20/106 | 725/32 |
| 2011/0088061 A1* | 4/2011 | Rowe | H04H 20/106 | 725/35 |
| 2011/0126227 A1* | 5/2011 | Corvin | G06Q 30/02 | 725/32 |
| 2011/0187932 A1* | 8/2011 | Kobayashi | H04N 7/163 | 348/563 |
| 2011/0265117 A1* | 10/2011 | Cha | H04H 60/32 | 725/35 |
| 2013/0276005 A1* | 10/2013 | Kim | G06Q 30/0241 | 725/8 |
| 2014/0096155 A1* | 4/2014 | Kim | H04N 21/254 | 725/32 |
| 2014/0109134 A1* | 4/2014 | Gauthier | G06Q 30/00 | 725/34 |
| 2015/0089538 A1* | 3/2015 | Kim | H04N 21/458 | 725/32 |

* cited by examiner

ADVERTISEMENT DISPLAY BASED ON CHANNEL SWITCH

TECHNICAL FIELD

This disclosure relates to the selective display of an advertisement based upon a channel switch.

BACKGROUND

Without the ability to retrieve information from a device, services that may be offered to a customer may become limited. For example, one way set-top boxes (STB), such as direct-to-home STBs or satellite direct-to-home STBS, may be installed in a subscriber premise, and these STBs are configured to provide video services to the subscriber. However, these one-way STBs are typically without the ability or are configured with a limited ability to transmit upstream communications. Thus, it is difficult or impossible to gather information from a one-way STB that may be used to expand or improve services offered to the subscriber. For example, without certain information associated with a subscriber's demographic or viewing preferences, content or service providers are unable to target advertisements to a specific subscriber.

As a result, static advertisements are typically output from a one-way STB to a display device, and these static advertisements are usually displayed in the form of moving picture experts group (MPEG) stills which may not be relevant to a viewer. Moreover, the static advertisements are not necessarily relevant to the content being viewed at a display device. Therefore, a need exists for improving upon methods and systems for displaying advertisement content from a one-way STB that is relevant to content being received through the STB.

BRIEF DESCRIPTION OF THE DRAWINGS

Like reference numbers and designations in the various drawings indicate like elements.

DETAILED DESCRIPTION

It is desirable to improve upon methods and systems for displaying advertisement content from a one-way STB that is relevant to content being received through the STB. Methods, systems, and computer readable media can be operable to facilitate selective advertisement display based on a channel switch. When a channel switch from a first channel to a second channel is initiated at a set-top box (STB), the STB may identify one or more properties associated with the second channel. Advertisement content may be stored at the STB, and each piece of advertisement content may be associated with one or more channel identifiers, genres/categories, or other channel properties. The STB may identify advertisement content that is associated with a channel identifier, genre/category, or other property of the second channel, and the identified advertisement content may be output to a display device during an acquisition of the second channel or for another predetermined duration.

An embodiment of the invention described herein may include a method comprising: (a) identifying a tuning of a set-top box to a channel; (b) identifying one or more properties associated with the channel; (c) identifying advertisement content based on the one or more properties associated with the channel; and (d) before outputting multimedia content associated with the channel, outputting the identified advertisement content to a display.

According to an embodiment of the invention, the one or more properties associated with the channel are identified from electronic program guide data.

According to an embodiment of the invention, the one or more properties associated with the channel are identified from information carried within a program map table.

According to an embodiment of the invention, the advertisement content is downloaded from an upstream server and stored at the set-top box.

According to an embodiment of the invention, the one or more properties associated with the channel comprise a genre of the channel, and the identified advertisement content is associated with the genre of the channel.

According to an embodiment of the invention, the one or more properties associated with the channel comprise a unique channel identifier of the channel, and the identified advertisement content is associated with the unique channel identifier of the channel.

According to an embodiment of the invention, the identified advertisement content is output to the display for the duration of an acquisition of the channel by the set-top box.

According to an embodiment of the invention, the identified advertisement content is output to the display for a predetermined duration before the multimedia content associated with the channel is output to the display.

An embodiment of the invention described herein may include an apparatus comprising: (a) a first interface configured to be used to receive a request for a channel change to an identified channel; (b) a module configured to: (i) identify one or more properties associated with the identified channel; and (ii) identify advertisement content based on the one or more properties associated with the identified channel; and (c) a second interface configured to be used to output the identified advertisement content to a display before outputting multimedia content associated with the identified channel to the display.

According to an embodiment of the invention, the apparatus described herein includes a data store configured to be used to store the advertisement content, wherein the advertisement content is downloaded from an upstream server.

An embodiment of the invention described herein may include one or more non-transitory computer readable media having instructions operable to cause one or more processors to perform the operations comprising: (a) identifying a tuning of a set-top box to a channel; (b) identifying one or more properties associated with the channel; (c) identifying advertisement content based on the one or more properties associated with the channel; and (d) before outputting multimedia content associated with the channel, outputting the identified advertisement content to a display.

Figure 1:
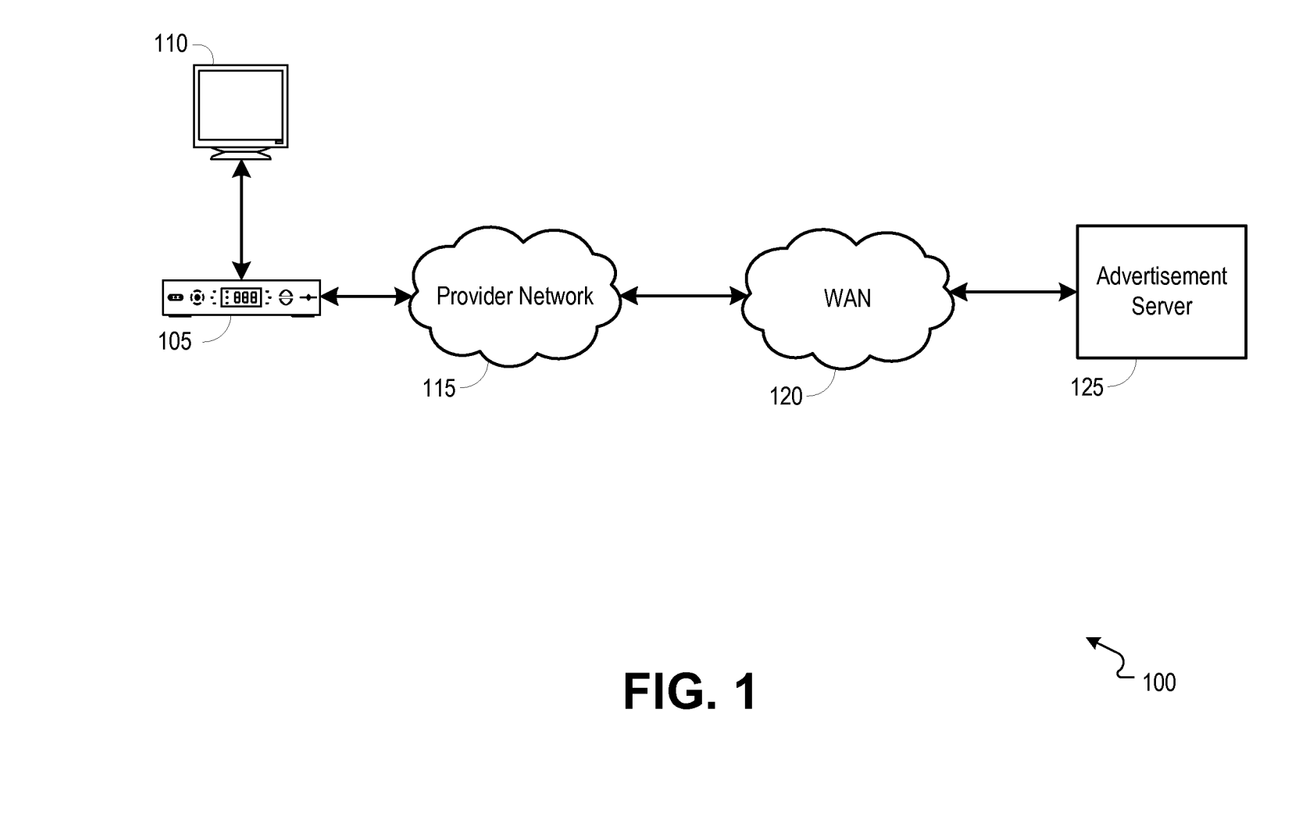
FIG. 1 is a block diagram illustrating an example network environment operable to facilitate selective advertisement display based on a channel switch.

FIG. 1 is a block diagram illustrating an example network environment 100 operable to facilitate selective advertisement display based on a channel switch. In embodiments, a set-top box (STB) 105 may receive data and/or video services at a subscriber premise, and may output received multimedia content to a display device 110 (e.g., television).

In embodiments, content may be delivered to a STB 105 over one or more channels through a provider network 115 (e.g., hybrid fiber-coaxial network, fiber network, cellular network, high speed data network, etc.). Content may be provided by a wide-area network (WAN) 120, and a headend device may format and package the content for delivery over the provider network 115. For example, linear content (e.g., real-time content) associated with a channel may be delivered to a STB 105 over a specific frequency and/or wavelength associated with the channel.

In embodiments, a STB 105 may consult a program map table (PMT) to identify specific content received by the STB 105 as a multimedia stream. For example, a tuner at the STB 105 may be tuned to a specific channel based upon a channel selection made at the STB 105 by a user. The tuner may identify and prepare for processing multimedia content associated with an identified channel.

In embodiments, the STB 105 may be a one-way STB configured to receive communications from the provider network 115 but without the ability to transmit upstream communications through the provider network 115. A tuner at the STB 105 may be used to allow a user to change content received and output for display by the STB 105.

In embodiments, the STB 105 may store advertisement content for output to a display device 110. Advertisement content may include still images, video clips, audio clips, and other types of multimedia. Advertisement content may be downloaded by the STB 105 from an advertisement server 125 and the advertisement content may be associated with one or more channel properties. For example, the advertisement content may be associated with one or more specific channel identifiers (e.g., channel number) or may be associated with one or more genres (e.g., channel or program genre). The downloaded advertisement and associated channel properties may be stored at the STB 105. The advertisement server 125 may be located at a network headend.

In embodiments, the STB 105 may select advertisement content for display at the display device 110 when a channel change takes place at the STB 105. When a user initiates a channel change at the STB 105, the STB 105 may identify the new channel and may identify one or more properties of the new channel (e.g., channel identifier, channel genre, etc.). Using the identified properties of the new channel, the STB 105 may determine whether relevant advertisement content is available at the STB 105. For example, the STB 105 may identify advertisement content having an association with the channel identifier, channel/program genre, or other properties of the new channel.

The STB 105 may output identified advertisement content to a display device 110 initiating the channel change. In embodiments, the advertisement content may be output to the display device 110 for the duration of a channel acquisition or for some predetermined period of time. For example, the advertisement content may be displayed at the display device 110 after a termination of the display of multimedia content associated with a previously viewed channel and before the commencement of the display of multimedia content associated with a new channel.

Figure 2:
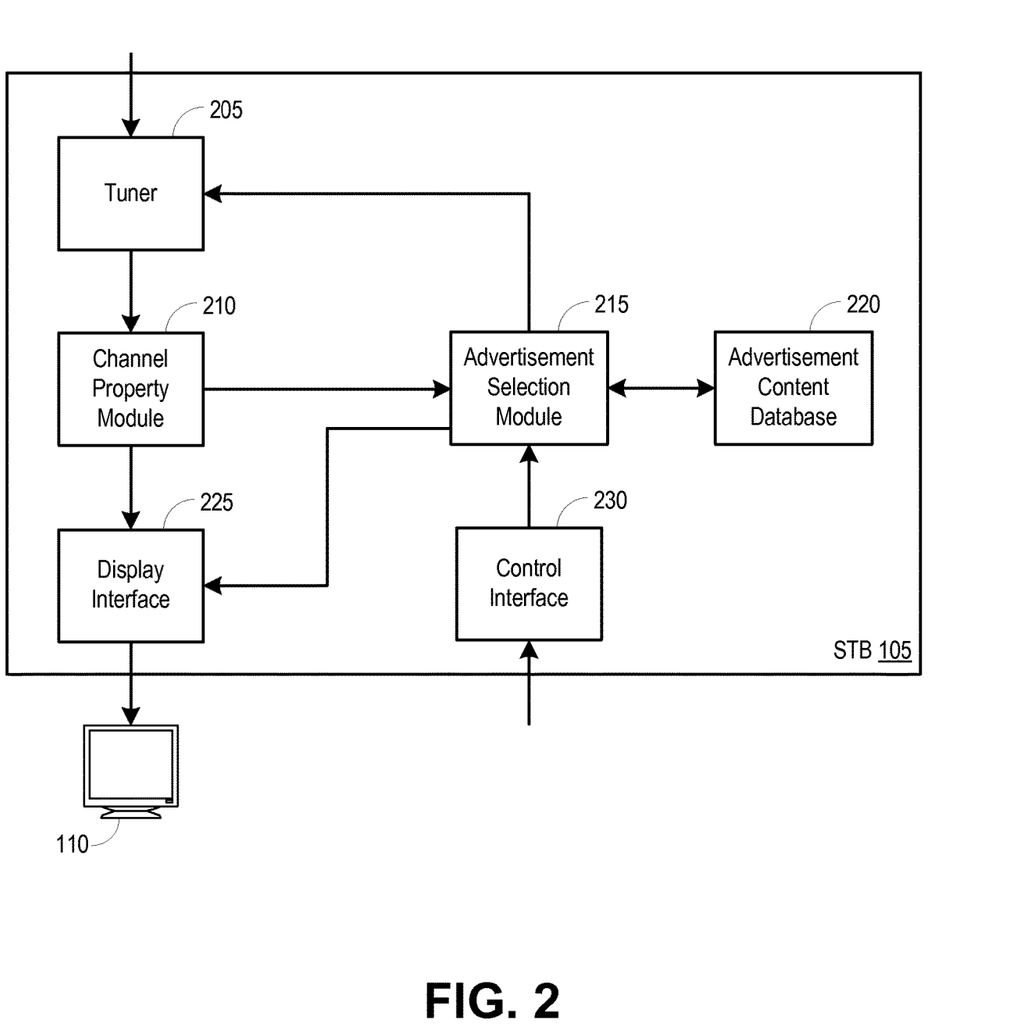
FIG. 2 is a block diagram illustrating an example set-top box (STB) operable to facilitate selective advertisement display based on a channel switch.

FIG. 2 is a block diagram illustrating an example set-top box (STB) 105 operable to facilitate selective advertisement display based on a channel switch. The STB 105 may include a tuner 205, a channel property module 210, an advertisement selection module 215, an advertisement content database 220, a display interface 225, and a control interface 230.

In embodiments, a tuner 205 may be tuned to a downstream frequency carrying a certain channel. A channel change may be carried out by tuning the tuner 205 away from a currently received channel to a new channel. After tuning the tuner 205 to receive a frequency associated with the new channel, the STB 105 may acquire a multimedia stream carrying multimedia content over the new channel.

In embodiments, the channel property module 210 may identify one or more properties associated with the channel received through the tuner 205. For example, the channel property module 210 may identify a unique channel identifier (e.g., physical channel number), a genre/category, and/or various other properties associated with the new channel. Channel properties may be identified from information carried within a program map table (PMT) or multimedia stream received along the new channel. Channel properties may be identified, and an advertisement content selection may be made based on the identified channel properties before audio/video associated with the new channel is acquired by the STB 105.

In embodiments, the advertisement selection module 215 may identify a channel change and one or more properties associated with the new channel from information received through the control interface 230. For example, a signal initiating a channel change may be received by the control interface 230 from a physical button located at the STB 105 (e.g., front panel of the STB 105) or from a remote control unit (RCU) associated with the STB 105, and the signal may identify a channel number associated with the new channel. The advertisement selection module 215 may retrieve additional information (e.g., genre of the channel, genre of a program currently airing on the channel, etc.) associated with the new channel, for example, from electronic program guide (EPG) information that is retrieved from a downstream signal or that is otherwise stored at the STB 105. For example, EPG information may associate a channel number with genre and/or programming information. Thus, relevant advertisement content may be selected before the tuner 205 is tuned to the new channel.

In embodiments, the advertisement selection module 215 may identify advertisement content associated with the one or more properties of the new channel. The advertisement content may be identified from the advertisement content database 220. For example, an association between advertisement content (e.g., still images, video clip, audio clip, etc.) and channel properties may be stored at the advertisement content database 220.

In embodiments, when multiple pieces of advertisement content are available in the advertisement content database 220 for a certain channel number, genre, or other channel property, the advertisement selection module may randomly select a piece of advertisement content or may alternate between the pieces of advertisement content with each channel change to an associated channel.

In embodiments, the advertisement selection module 215 may output identified advertisement content (e.g., advertisement content associated with one or more properties of the new channel) to a display device 110 through the display interface 225. The identified advertisement content may be output to the display device 110 after the output of content associated with a prior channel has been terminated and before the output of content associated with the new channel has started. In embodiments, the identified advertisement content may be output for the duration of an acquisition of the new channel by the STB 105, or may be output for a predetermined duration (e.g., 3-5 seconds). A predetermined duration for which the advertisement content is to be displayed at the display device 110 before beginning the output of content associated with the new channel may be configured by a setting stored at the advertisement selection module 215. For example, the stored advertisement content may include information (e.g., metadata) indicating a duration for which the content is to be displayed at a display device 110.

In embodiments, advertisement content may be downloaded from an upstream server (e.g., advertisement server 125 of FIG. 1) and may be stored at the advertisement content database 220 (e.g., stored in read-only memory (ROM) or flash memory). The advertisement content may include a plurality of still images, wherein each still image is associated with one or more channels, one or more genres/categories, or other channel properties. The association between a still image and channel properties may be stored in the still image frame (e.g., as metadata). It should be understood that the advertisement content stored at the advertisement content database 220 may be updated and may include a plurality of images or other content associated with the same channel number, genre, or other channel property.

In embodiments, the advertisement content downloaded from the upstream server may be selectively downloaded based upon one or more channel selections made at the STB 105, identified preferences of one or more users of the STB 105, geographic or demographic information associated with a region within which the STB 105 is operating, and various other information. For example, multiple versions (e.g., various languages or various resolutions/bitrates) of a single piece of advertisement content may be available at an upstream server, and one or more versions of a piece of advertisement content may be selectively downloaded to the STB 105 based on the region within which the STB 105 is located, the capabilities or authorizations of the STB 105, or the bandwidth that is available for delivering content to the STB 105.

Each piece of advertisement content may further be associated with a retention duration. For example, the advertisement content frame may include a retention duration identifying a time at which the piece of advertisement content is to be deleted from the advertisement content database 220. The advertisement content database 220 may be updated with additional content after the deletion of a piece of advertisement content that has been deleted based on an expiration of an associated retention duration. For example, when a piece of advertisement content is deleted from the advertisement content database 220, or when the advertisement content database 220 has space for storing additional pieces of advertisement content, new advertisement content may be downloaded from an upstream server (e.g., advertisement server 125).

Figure 3:
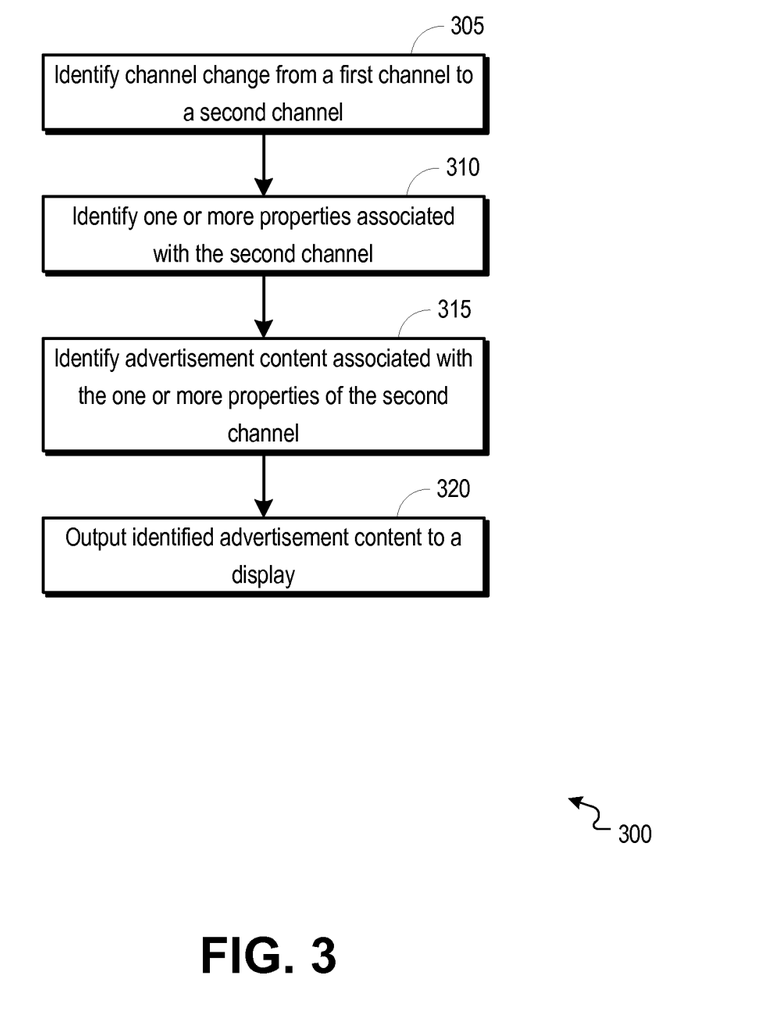
FIG. 3 is a flowchart illustrating an example process operable to facilitate selective advertisement display based on properties associated with a new channel.

FIG. 3 is a flowchart illustrating an example process 300 operable to facilitate selective advertisement display based on properties associated with a new channel. The process 300 may begin at 305 when a channel change is identified at a STB 105 of FIG. 1. For example, the STB 105 may receive a user-initiated request to tune away from a first channel and to tune to a second channel. A tuner (e.g., tuner 205 of FIG. 2) may be tuned away from the first channel and to the second channel.

At 310, one or more properties associated with the second channel may be identified. Properties associated with the second channel may be identified, for example, by a channel property module 210 of FIG. 2 or advertisement selection module 215 of FIG. 2. In embodiments, channel properties may include a unique channel identifier (e.g., physical channel number), a genre/category associated with the channel (e.g., sports, outdoors, news, learning, youth, etc.), a genre/category associated with a specific program currently airing on the channel, and other properties associated with the second channel.

At 315, advertisement content associated with the one or more properties of the second channel may be identified. Advertisement content such as still images, video clips, audio clips, and others may be stored at the STB 105 (e.g., at the advertisement content database 220 of FIG. 2) and may be associated with specific channel properties (e.g., channel numbers, genres, etc.). In embodiments, the advertisement selection module 215 may identify advertisement content stored at the STB 105 that is associated with one or more of the properties of the second channel.

At 320, identified advertisement content may be output to a display. The advertisement content may be output from the STB 105 to a display device 110 of FIG. 1. In embodiments, the advertisement content may be output to the display device 110 after the display of content associated with the first channel has been terminated and before a display of content from the second channel has started. For example, the advertisement content may be displayed during an acquisition of the second channel by the STB 105. In embodiments, the advertisement content may be displayed at the display device 110 for a certain predetermined duration (e.g., 3-5 seconds). After, the expiration of the predetermined duration or channel acquisition, output of the advertisement content may be terminated and multimedia content associated with the second channel may be output to the display device 110.

Figure 4:
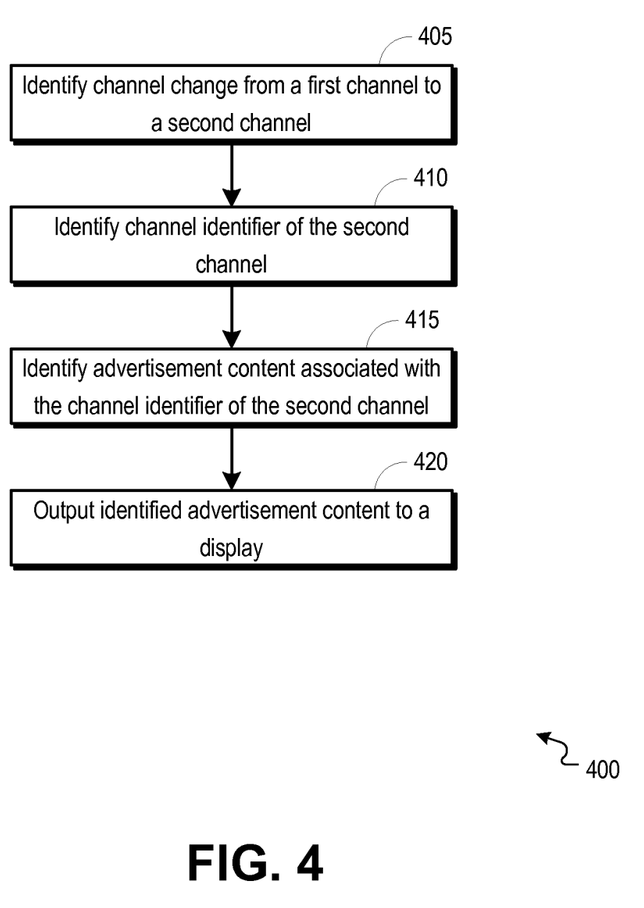
FIG. 4 is a flowchart illustrating an example process operable to facilitate selective advertisement display based on a channel identifier associated with a new channel.

FIG. 4 is a flowchart illustrating an example process 400 operable to facilitate selective advertisement display based on a channel identifier associated with a new channel. The process 400 may begin at 405 when a channel change is identified at a STB 105 of FIG. 1. For example, the STB 105 may receive a user-initiated request to tune away from a first channel and to tune to a second channel. A tuner (e.g., tuner 205 of FIG. 2) may be tuned away from the first channel and to the second channel.

At 410, a channel identifier associated with the second channel may be identified. A channel identifier associated with the second channel may be identified, for example, by a channel property module 210 of FIG. 2 or advertisement selection module 215 of FIG. 2. In embodiments, the channel identifier (e.g., physical channel number) may provide a unique identification of the second channel to which the STB 105 is to be tuned.

At 415, advertisement content associated with the channel identifier of the second channel may be identified. Advertisement content such as still images, video clips, audio clips, and others may be stored at the STB 105 (e.g., at the advertisement content database 220 of FIG. 2) and may be associated with one or more specific channel identifiers. In embodiments, the advertisement selection module 215 may identify advertisement content stored at the STB 105 that is associated with the channel identifier of the second channel.

At 420, identified advertisement content may be output to a display. The advertisement content may be output from the STB 105 to a display device 110 of FIG. 1. In embodiments, the advertisement content may be output to the display device 110 after the display of content associated with the first channel has been terminated and before a display of content from the second channel has started. For example, the advertisement content may be displayed during an acquisition of the second channel by the STB 105. In embodiments, the advertisement content may be displayed at the display device 110 for a certain predetermined duration (e.g., 3-5 seconds). After, the expiration of the predetermined duration or channel acquisition, output of the advertisement content may be terminated and multimedia content associated with the second channel may be output to the display device 110.

Figure 5:
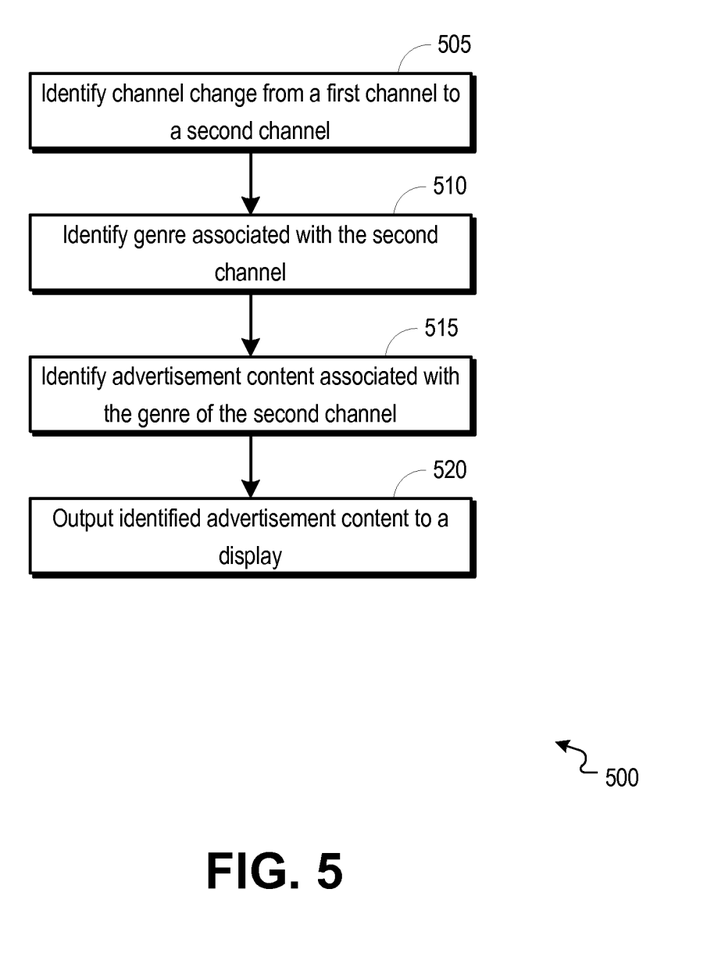
FIG. 5 is a flowchart illustrating an example process operable to facilitate selective advertisement display based on a genre/category associated with a new channel.

FIG. 5 is a flowchart illustrating an example process 500 operable to facilitate selective advertisement display based on a genre/category associated with a new channel. The process 500 may begin at 505 when a channel change is identified at a STB 105 of FIG. 1. For example, the STB 105 may receive a user-initiated request to tune away from a first channel and to tune to a second channel. A tuner (e.g., tuner 205 of FIG. 2) may be tuned away from the first channel and to the second channel.

At 510, a genre/category associated with the second channel may be identified. A genre/category associated with the second channel may be identified, for example, by a channel property module 210 of FIG. 2 or advertisement selection module 215 of FIG. 2. In embodiments, the genre/category associated with the second channel may be identified based on a mapping between a unique channel identifier and a corresponding genre/category or may be identified from a downstream packet or frame received along the second channel.

At 515, advertisement content associated with the genre/category of the second channel may be identified. Advertisement content such as still images, video clips, audio clips, and others may be stored at the STB 105 (e.g., at the advertisement content database 220 of FIG. 2) and may be associated with specific genres/categories. In embodiments, the advertisement selection module 215 may identify advertisement content stored at the STB 105 that is associated with a genre/category of the second channel.

At 520, identified advertisement content may be output to a display. The advertisement content may be output from the STB 105 to a display device 110 of FIG. 1. In embodiments, the advertisement content may be output to the display device 110 after the display of content associated with the first channel has been terminated and before a display of content from the second channel has started. For example, the advertisement content may be displayed during an acquisition of the second channel by the STB 105. In embodiments, the advertisement content may be displayed at the display device 110 for a certain predetermined duration (e.g., 3-5 seconds). After, the expiration of the predetermined duration or channel acquisition, output of the advertisement content may be terminated and multimedia content associated with the second channel may be output to the display device 110.

Figure 6:
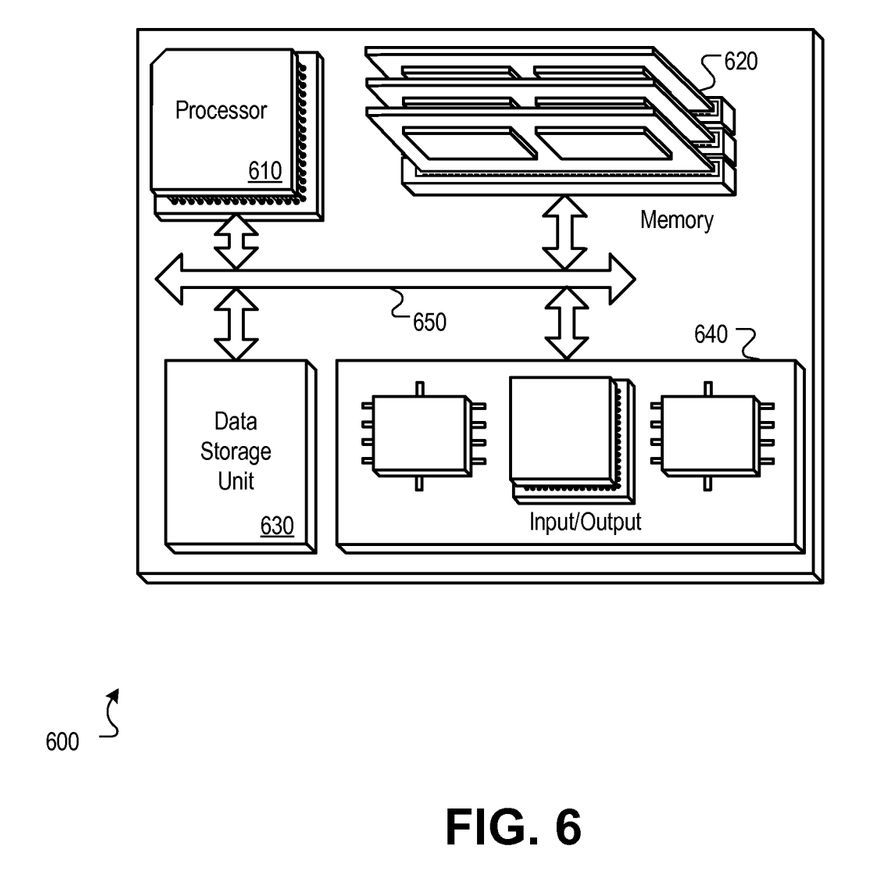
FIG. 6 is a block diagram of a hardware configuration operable to facilitate selective advertisement display based on a channel switch.

FIG. 6 is a block diagram of a hardware configuration 600 operable to facilitate selective advertisement display based on a channel switch. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting voice, video, and/or data services to a display device 110 of FIG. 1 (e.g., television). In embodiments, the input/output device can include driver devices configured to send communications to, and receive communications from one or more networks (e.g., local network, provider network 115 of FIG. 1, WAN 120 of FIG. 1, etc.).

Those skilled in the art will appreciate that the invention improves upon methods and systems for displaying advertisement content relevant to content being viewed. Methods, systems, and computer readable media can be operable to facilitate selective advertisement display based on a channel switch. When a channel switch from a first channel to a second channel is initiated at a set-top box (STB), the STB may identify one or more properties associated with the second channel. Advertisement content may be stored at the STB, and each piece of advertisement content may be associated with one or more channel identifiers, genres/categories, or other channel properties. The STB may identify advertisement content that is associated with a channel identifier, genre/category, or other property of the second channel, and the identified advertisement content may be output to a display device during an acquisition of the second channel or for another predetermined duration.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    identifying a tuning of a set-top box to a channel, wherein the tuning of the set-top box to the channel is identified in response to receiving a signal initiating a channel change;
    in response to the identification of the tuning of the set-top box to the channel, identifying one or more properties associated with the channel, wherein the one or more properties are identified from a program map table associated with the channel, and wherein the one or more properties are identified before audio/video associated with the channel is acquired by the set-top box;
    identifying advertisement content based on the one or more properties associated with the channel, wherein the identified advertisement content is identified from a plurality of pieces of advertisement content that are selectively downloaded from an upstream server and stored at the set-top box before the signal initiating the channel change is received, wherein the plurality of pieces of advertisement content are selectively downloaded based upon one or more identified preferences of one or more users of the set-top box, and wherein the plurality of pieces of advertisement content are selected for downloading based upon one or more properties associated with the set-top box;
    for a certain predetermined duration before outputting multimedia content associated with the channel:
        outputting the identified advertisement content to a display; and
    wherein the certain predetermined duration is identified from metadata associated with the identified advertisement content stored at the set-top box, wherein the certain predetermined duration is identified within the metadata as an indication of a duration for which the identified advertisement content is to be displayed.

2. The method of claim 1, wherein the one or more properties associated with the channel are identified from electronic program guide data.

3. The method of claim 1, wherein the one or more properties associated with the channel comprise a genre of the channel, and wherein the identified advertisement content is associated with the genre of the channel.

4. The method of claim 1, wherein the one or more properties associated with the channel comprise a unique channel identifier of the channel, and wherein the identified advertisement content is associated with the unique channel identifier of the channel.

5. The method of claim 1, wherein the certain predetermined duration is a duration of an acquisition of the channel by the set-top box.

6. The method of claim 1, wherein the certain predetermined duration is a duration before the multimedia content associated with the channel is output to the display.

7. An apparatus comprising:
a first interface configured to be used to receive a request for a channel change to an identified channel;
a module configured to:
identify one or more properties associated with the identified channel, wherein the one or more properties are identified from a program map table associated with the channel, and wherein the one or more properties are identified before audio/video associated with the channel is acquired by the set-top box; and
identify advertisement content based on the one or more properties associated with the identified channel, wherein the identified advertisement content is identified from a plurality of pieces of advertisement content that are selectively downloaded from an upstream server before the request for the channel change to the identified channel is received, wherein the plurality of pieces of advertisement content are selectively downloaded based upon one or more identified preferences of one or more users of the set-top box, and wherein the plurality of pieces of advertisement content are selected for downloading based upon one or more properties associated with the set-top box; and
for a certain predetermined duration before outputting multimedia content associated with the identified channel, output the identified advertisement content, wherein the certain predetermined duration is identified from metadata associated with the identified advertisement content, wherein the certain predetermined duration is identified within the metadata as an indication of a duration for which the identified advertisement content is to be displayed; and
a second interface configured to be used to output the identified advertisement content to a display for the certain predetermined duration before outputting multimedia content associated with the identified channel to the display.

8. The apparatus of claim 7, wherein the one or more properties associated with the identified channel are identified from electronic program guide data.

9. The apparatus of claim 7, wherein the one or more properties associated with the identified channel comprise a genre of the identified channel, and wherein the identified advertisement content is associated with the genre of the identified channel.

10. The apparatus of claim 7, wherein the one or more properties associated with the identified channel comprise a unique channel identifier of the identified channel, and wherein the identified advertisement content is associated with the unique channel identifier of the identified channel.

11. One or more non-transitory computer readable media having instructions operable to cause one or more processors to perform the operations comprising:
identifying a tuning of a set-top box to a channel, wherein the tuning of the set-top box to the channel is identified in response to receiving a signal initiating a channel change;
in response to the identification of the tuning of the set-top box to the channel, identifying one or more properties associated with the channel, wherein the one or more properties are identified from a program map table associated with the channel, and wherein the one or more properties are identified before audio/video associated with the channel is acquired by the set-top box;
identifying advertisement content based on the one or more properties associated with the channel, wherein the identified advertisement content is identified from a plurality of pieces of advertisement content that are selectively downloaded from an upstream server and stored at the set-top box before the signal initiating the channel change is received, wherein the plurality of pieces of advertisement content are selectively downloaded based upon one or more identified preferences of one or more users of the set-top box, and wherein the plurality of pieces of advertisement content are selected for downloading based upon one or more properties associated with the set-top box; and
for a certain predetermined duration before outputting multimedia content associated with the channel:
outputting the identified advertisement content to a display; and
wherein the certain predetermined duration is identified from metadata associated with the identified advertisement content stored at the set-top box, wherein the certain predetermined duration is identified within the metadata as an indication of a duration for which the identified advertisement content is to be displayed.

12. The one or more non-transitory computer-readable media of claim 11, wherein the one or more properties associated with the channel are identified from electronic program guide data.

13. The one or more non-transitory computer-readable media of claim 11, wherein the one or more properties associated with the channel comprise a genre of the channel, and wherein the identified advertisement content is associated with the genre of the channel.

14. The one or more non-transitory computer-readable media of claim 11, wherein the one or more properties associated with the channel comprise a unique channel identifier of the channel, and wherein the identified advertisement content is associated with the unique channel identifier of the channel.

* * * * *